United States Patent Office 2,952,585
Patented Sept. 13, 1960

2,952,585
IMMUNIZING AGAINST AND TREATMENT OF DISEASES

John H. Heller, Wilton, Conn., assignor to New England Institute for Medical Research, Ridgefield, Conn., a corporation of Connecticut No Drawing. Filed June 19, 1957, Ser. No. 666,776

13 Claims. (Cl. 167—78)

This invention relates to improvements in method and means for immunizing mammals and birds against various infections to which they are susceptible and for treating mammals and birds for alleviating diseases.

It has long been known that immunity, for instance, may be developed in mammals and birds against various toxins by introducing a corresponding toxoid into the body. Numerous effective toxoids are known and are being successfully used. Various antigens and allergens, hormones and therapeutic agents are also being successfully used in this way for the prevention and treatment of various infections, diseases or dysfunctions.

Though various specifics are known and in general use for the treating of various conditions and for immunizing against them, frequently the effectiveness of the specific is of short duration, so that repeated treatment is necessary, or else the agent must be administered in doses of such size as to cause undesirable side-effects.

It is a purpose of my present invention to increase or prolong the effectiveness of toxoids, antigens, antiallergic agents, hormones, therapeutic agents and the like, in general, in preventing or alleviating infections and diseases, and to accomplish this with a materially reduced dosage of the agent.

This purpose is accomplished by my present invention in accordance with a new principle of depot medication whereby there is induced significantly greater and longer lasting immunity, and in accordance with which I administer the toxoid, or other selected agent, in a state of adsorption in or on carbon black.

It has beeen generally recognized that a primary defense of mammals and birds against infection is the reticuloendothelial system, commonly referred to as the RES, and so designated herein for brevity. The RES is composed essentially of phagocytic cells, located primarily in the liver, spleen and bone marrow, but to a lesser extent scattered throughout most of the body as fixed or "wandering" cells. One of the functions of these cells is to clear the blood stream of bacteria, and other particulate material, which may be present in the blood stream or in the lymph system, by phagocytosis. Where infectious foreign matter, bacteria for instance, enters the body of a host, these phagocytic cells of the RES in some way envelop and destroy the bacteria, thus rendering the bacteria impotent. The development of antibodies against the invading bacteria appears to be closely related to, and a sequel of, this phagocytosis, in some way not fully understood.

In the extensive study of the RES, it has been established that where an appropriate aqueous suspension of colloidal carbon black is injected intravenously into a host, this foreign particulate matter is quickly taken-up from the blood stream by the phagocytic action of the RE cells, i.e. the reticuloendothelial cells of the RES. The particles are phagocytized preferentially by RE cells in the liver and by the spleen cells, as well as other loci, according to particle size and electro-charge.

I utilize this selective phagocytic activity of the RE cells toward carbon black to direct selectively an antigen, toxoid, hormone therapeutic agent or the like to that portion of the body where it is most effective by adsorbing the antigen or the like in or on carbon black particles prior to their injection, so that the agent is conveyed by the carbon black particles directly to the RE cells and is more quickly and more effectively taken up by the cells, together with the carbon black particles.

A major limiting factor in the development of any new therapeutic agent is that the entire body must be "drenched" with the substance so that the cells or organ which one specifically desires to reach will have an adequate amount. The side-effects, toxic or otherwise, of "drenching" the entire body are a major limiting and interdicting obstacle to the use of innumerable otherwise useful agents.

Critical aspects of this invention are the particle size, or range of particle sizes, the charge, adsorptivity, state of aggregation of, and suspending agent for, the colloidal carbon black. The adsorbed agent must not be too lightly adsorbed and hence lost before it reaches the RE cells, neither must it be too tightly adsorbed and hence unavailable for its function. Colloidal carbon black having a particle diameter of from 1 to 100 millimicrons (Paint, Oil and Chemical Review, vol. 115, No. 8, page 22, April 10, 1952) is admirably suited as far as its range of particle sizes is concerned.

In the previous investigations of the RES involving the injection of colloidal carbon, difficulties have been experienced due to the accumulation of the carbon in the lungs. Early experimenters used India ink as their source of carbon black. It was not known until 1953 that the shellac and other gums present in the ink were not tolerated by the body. By careful control of particle size, by choice of original material and by ultracentrifuging and avoiding excessive agglomeration of the colloid in the environment of plasma or other body fluids, I can avoid any significant deposition of carbon black in the lungs and selectively bring about its deposition largely in the liver, spleen and bone marrow.

In the presently preferred aspect of the invention, the carbon black having the toxoid, antigen or the like adsorbed thereon is injected parenterally in suspension in a physiological aqueous suspension which must, of course, be free from pyrogens which might cause shock, chills or high fever. The colloidal suspension must be so prepared that the particles retain an electro-negative charge in the body fluids, and do not agglomerate significantly, in the plasma, lymph or other body fluids. It is also essential that the toxoid, antigen or the like be adsorbed in or on the carbon black particles in such a way that it is retained thereby until phagocytosis of the particle has occurred. Various procedures may be employed in the preparation of the colloidal suspension so long as denaturation of the antigen or the like is avoided by the selected procedure.

It is essential that the adsorption force be sufficiently great to prevent desorption en route to the RE cells. On the other hand, it must not be so great as to prevent desorption once the particle is in the RE cell or, in the case of macromolecules such as a protein, the adsorptive force must not be so great as to uncoil or otherwise denature the protein.

The size of the carbon black particles thereof may be varied, depending primarily upon the location in the body to which it is desired selectively to direct the agent. They may be as small as 5 millimicrons, or even 2 millimicrons. Usually the size of the largest particle should not exceed about 80 millimicrons. I have found that, where the particle size of the carbon black colloid does not exceed this maximum, and excessive agglomeration after injection is avoided, the carbon black has no noticeable toxic effect and may be administered in surprisingly large amounts without ill effect on the host, providing, of course, that the suspension used for intravenous injection is sterile, isotonic, and free from pyrogens and other contaminants, as indicated above.

The colloidal carbon used in accordance with the present invention, herein designated "carbon black" is not to be confused with the various chars produced by destructive distilling of animal or vegetable matter. It is produced by the pyrolysis of liquid or gaseous hydrocarbons and is substantially free from mineral matter.

The proportion of the toxoid, antigen or the like adsorbed on the carbon black may vary over a considerable range and will usually be determined by the adsorptive capacity of the particular carbon black for the particular agent adsorbed. The amount of carbon black administered will, in large measure, depend upon the amount of the agent adsorbed thereon. In general, the carbon black having the agent adsorbed thereon or therein to be administered by injection will be prepared in colloidal suspension in a physiological isotonic solution. The suspension may be administered in appropriate amounts, usually proportionate to the body weight, by injection intravenously, subcutaneously or intraperitoneally. It may also be administered intramuscularly, or as a transfusion, or intravenous feeding or by inhalation in a dry powder form or aerosol.

The invention has been applied effectively, without deleterious side-effects, to lower animals and birds and is believed to be effective in the treatment of human beings, though conclusive clinical evidence concerning the latter is not presently available.

Large doses of carbon black have been injected intravenously into human beings with no toxic side-effects. But in my controlled testing of immunity, in which I have used botulinum toxin, the most virulent protein toxin known to man, I have carried out the tests on lower animals, as is customary in this field of research, before proceeding with tests on human beings. As will be described below, protection of such lower animals by the above-described methods has been obtained.

For example, I have immunized mice against this botulinum infection, which is also a serious problem with respect to ducks, pheasants and other fowl, both domestic and wild.

As previously noted, botulinum is recognized to be one of the most toxic, deadly poisons known. Effective botulinum toxoid has been prepared by treating the botulinum toxin with formaldehyde. This toxoid has been used effectively in accordance with the present invention in developing in mice an immunity for this deadly toxin.

More particularly, a suspension of carbon black, of a particle size within the range of 18–25 millimicrons, and having the botulinum toxoid adsorbed thereon, was prepared in a physiological solution and, at intervals one week apart, 20-gram albino mice were twice injected intravenously with $\frac{1}{10}$ cc. of the suspension containing 0.7 milligram of the carbon black having deposited thereon 70 micrograms of the protein toxoid. No ill effects were apparent. One week following the last injection, the mice were given ten 100% lethal doses of the botulinum toxin without ill effect, while the controls died within 30 minutes, showing that by this method there was developed within the mice an effective immunity for this deadly poison.

The size and potency of the injection should be varied depending upon the weight of the mammal or bird treated. Where a 20-gram mouse is immunized by administering the toxoid protein in the customary manner, i.e. not adsorbed on carbon black, 8.5 milligrams of the toxoid would normally be required to establish comparable immunity.

In the treating of wild fowl, e.g. ducks and pheasants, care must be exercised to avoid domesticating them. For this reason, handling and confining of the fowl must be reduced to a minimum. Preferably the immunizing should be effected by a single handling. By my present invention, this may be accomplished by a single injection of the toxoid.

In the immunizing of pheasants, for instance, against *Clostridium botulinum*, type C, the toxoid is with advantage adsorbed on carbon black and the fowl injected with an aqueous suspension thereof. To develop in a 4-pound fowl, for instance, a botulinum immunity by administering the toxoid in the conventional manner, requires 275 milligrams of the toxoid. In accordance with my present invention, comparable immunity can be effected by intravenously injecting the fowl with a suspension of carbon black, in the particle size range of 18–25 millimicrons, in physiological, isotonic solution, on which there is adsorbed $\frac{1}{100}$ that amount of the toxoid.

The invention will be further illustrated by the following specific example of immunizing against botulinum infection, it being understood that the invention is not restricted to the particular aspects thereof illustrated.

*Clostridium botulinum* type C toxin is harvested from a ten-day culture of *Cl. botulinum*, type C, grown within a cellophane dialyzing sack, the medium used being cleared cornsteep liquor enriched with 6.5% glycerin and 0.1% $CaCl_2$. The crude toxin is freed from the organisms by centrifugation and subsequent filtration. The toxin is then concentrated to $\frac{1}{10}$ of its original value by lyophilization. On dialysis of the concentrate, the toxin is precipitated. The precipitate is dissolved in a sterile sodium chloride aqueous solution (0.9%) and adjusted to pH 4.5 at which point the toxin flocculates. This toxin so prepared contains a 2,000,000 MLD per 0.1 cc., or, for a 20-gram mouse, and is shown by chemical analysis to contain 0.1 mg. of protein nitrogen per ml.

To produce the toxoid, formaldehyde is added to the toxin until the concentration of the formalin is 0.5%. The toxin is then incubated at 37° C. for 10 days. After that period, the resultant toxoid is tested in mice for residual toxicity. If the mice survive injections of 1 ml. of the undiluted toxoid daily for 4 days, the toxoid is ready for use.

A colloidal suspension of carbon black of a mean particle size of 25 millimicrons and containing 90 mg. of solid material per ml. is diluted with water to contain 20 mg. of solid per ml. An aliquot of the purified toxoid is added to 5 times the volume of the carbon black suspended at pH 6.8, at which pH the carbon black remains in colloidal suspension. The mixture is then left at 4° C. for 12 to 16 hours. The toxoid-carbon black mixture is then adjusted to pH 2, causing the carbon black agglomerates to drop out of the suspension. The mixture is then centrifuged at 12,000 r.p.m. for 30 minutes (24,500 g.), and the resultant supernate is decanted and saved.

The sediment is resuspended in sodium phosphate buffer solution at a pH of 6.8. The suspension becomes colloidal again at this pH and does not sediment.

The above procedure of precipitating, separating and resuspending is repeated three times. After each washing, the supernate is tested to determine the amount of toxoid remaining in the supernate. Ordinarily the second and third washings contain no toxoid. The final suspension of the carbon black adsorbed toxoid in the sodium phosphate buffer at pH 6.8 is filtered through a clarifying type sintered glass filter and analyzed for the amount of toxoid present by measuring the amount of protein present on the carbon black. The suspension is now ready for injection.

*Mode of administration of the toxoid*

Two routes of administration are possible. The first is conventional—intramuscularly. The second, since the amount of carbon to be injected is innocuous, is intravenously. At present, the recommended procedure with botulinum toxoid is at least 6 injections over a period of two to three weeks. But, since, in accordance with my invention, the carbon black retains the adsorbed toxoid and releases it gradually in the RES, two injections of 1 ml. each, spread one week apart will usually be found sufficient.

By the intravenous route, the carbon black toxoid is very rapidly taken up by the reticuloendothelial cells of the liver and speen, thus forming a depot source of antigenic material without the need for replenishing by additional inoculation.

*Test for immunity in the immunized mammals or birds*

Two types of challenge may be used. One is by the injection of graded lethal doses of the toxin into the immunized mammal or bird to determine the highest dose they can tolerate. The second is by feeding the mammals and birds graded amounts of toxin added to their drinking water. The latter is believed to be a better index of immunity since it involves the natural route of botulinum intoxication.

I claim:

1. As a composition of matter, colloidal carbon black having adsorbed thereon an agent selected from the group consisting of toxoids, antigens, anti-allergic agents, hormones, natural and synthetic, and therapeutics.

2. As a composition of matter, colloidal carbon black of a mean particle size within the range of 2–25 millimicrons and having adsorbed thereon an agent selected from the group consisting of toxoids, antigens, antiallergic agents, hormones, natural and synthetic, and therapeutics.

3. A stable suspension, in physiological, isotonic solution, sterile and pyrogen free for intravenous injection, of colloidal carbon black of a particle size within the range of 2–25 millimicrons and having adsorbed thereon an agent selected from the group consisting of toxoids, antigens, anti-allergic agents, hormones, natural and synthetic, and therapeutics.

4. The suspension of claim 3 in which the particle size of the carbon black is within the range of 18–25 millimicrons.

5. A stable suspension, in physiological, istonic solution, sterile and pyrogen free for intravenous injection, of colloidal carbon black of a particle size within the range of 18–25 millimicrons and having adsorbed thereon an agent selected from the group consisting of toxoids, antigens, anti-allergic agents, hormones, natural and synthetic, and therapeutics, the liquid phase of the suspension being substantially free from said agent.

6. A stable suspension, in physiological, isotonic solution, sterile and pyrogen free for intravenous injection, of colloidal carbon black of a particle size within the range of 18–25 millimicrons and having adsorbed thereon an agent selected from the group consisting of toxoids, antigens, anti-allergic agents, hormones, natural and synthetic, and therapeutics, the liquid phase of the suspension being substantially free from said agent and the carbon black particles with the agent adsorbed thereon having electro-negatively charged surfaces.

7. A stable suspension, in physiological, isotonic solution, sterile and pyrogen free for intravenous injection, of colloidal carbon black of a particle size within the range of 18–25 millimicrons and having botulinum toxoid adsorbed thereon.

8. A stable suspension, in physiological, isotonic solution, sterile and pyrogen free for intravenous injection, of colloidal carbon black of a particle size within the range of 18–25 millimicrons and having botulinum toxoid adsorbed thereon, the liquid phase of the suspension being substantially free from the toxoid.

9. In the method of administering toxoids, antigens, anti-allergic agents, hormones, therapeutic and like agents to mammals and birds, the steps of adsorbing the agent on non-toxic colloidal carbon black particles, and introducing the agent into the body in the state of adsorption on the carbon black.

10. The method of claim 9 in which the agent is adsorbed on carbon black particles of a particle size within the range of 18–25 millimicrons.

11. Method of conveying toxoids, antigens, antiallergic agents, hormones, therapeutic and like agents, selectively, to the RE cells of mammals and birds which comprises adsorbing the agent on non-toxoid colloidal carbon black particles, suspending the particles in physiological, isotonic solution and parenterally injecting the suspension into the body.

12. The method of claim 11 in which the agent is adsorbed on carbon black of a particle size within the range of 2–25 millimicrons.

13. The method of immunizing mammals and birds against bacterial toxin which comprises de-toxifying the toxin, adsorbing the de-toxified toxin on carbon black particles of a particle size within the range of 2–25 millimicrons, suspending the carbon black particles having the de-toxified toxin adsorbed thereon in the physiological isotonic solution and parenterally injecting the resulting colloidal suspension into the body.

References Cited in the file of this patent

UNITED STATES PATENTS

| 2,143,088 | Rockwell | Jan. 10, 1939 |
| 2,897,115 | Dullaghan | July 28, 1959 |

OTHER REFERENCES

Kato et al.: Interntl. J. Leprosy, vol. 23, No. 4, pp. 406–417, 1955 (as cited in April 1947, Biol. Abstr. 11462 and 11463).

Rossman: Ind. and Eng. Chem., vol. 35, No. 9, September 1943, pp. 972–976.

Wiegand: India Rubber World, December 1941, p. 270.

Development of Carbon Black: 1945, p. 90.